United States Patent Office 3,464,994
Patented Sept. 2, 1969

3,464,994
THEBAINE AND DRIPAVINE DERIVATIVES AND PHARMACEUTICALLY ACCEPTABLE SALTS THEREOF
Kenneth Walter Bentley, Willerby, England, Denis Geoffrey Hardy, Aberdeen, Scotland, and Alan Charles Brandon Smith, Hull, England, assignors to Reckitt & Sons Limited, Hull England, a British company
No Drawing. Continuation-in-part of application Ser. No. 571,386, Aug. 10, 1966. This application May 16, 1968, Ser. No. 729,505
Claims priority, application Great Britain, Aug. 13, 1965, 34,840/65
Int. Cl. C07d 43/28; A61k 27/00
U.S. Cl. 260—285                                            4 Claims

ABSTRACT OF THE DISCLOSURE

Novel derivatives of thebaine and oripavine of the formula:

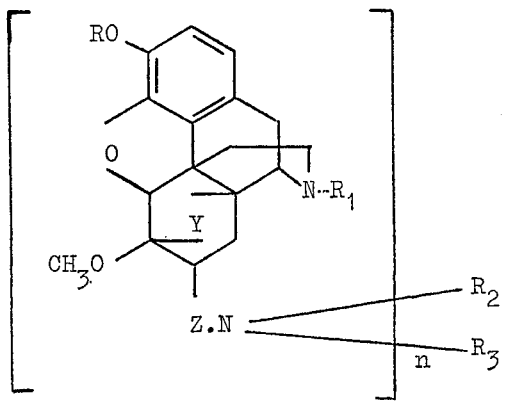

wherein:

$n$ is the integer 1 or 2;
Y is etheno (—CH=CH—) or ethno (—CH$_2$—CH$_2$—);
Z is carbonyl or methylene;

R$_1$ is alkyl, alkenyl or alkynyl of up to 5 carbon atoms or cycloalkyl methyl of 4 to 6 carbon atoms;
R$_2$ is hydrogen, cycloalkyl of 5 or 6 carbon atoms, phenyl, tolyl, monochlorophenyl, dichlorophenyl, naphthyl, alkyl of 1 to 6 carbon atoms, alkyl of 1 to 3 carbon atoms, monosubstittued by phenyl, hydroxy, furyl, dimethylamino or diethylamino;
R$_3$ is, when $n=1$, any one of the substituents set out for R$_2$, and R$_2$ and R$_3$ when taken together with the nitrogen atom to which R$_2$ and R$_3$ are attached is morpholino, piperidino, pyrrolidino, piperazino or N-methyl piperazino; and when Z is carbonyl either R$_2$ or R$_3$ is amino when the other group R$_2$ or R$_3$ is hydrogen;
R$_3$ is, when $n=2$, the divalent group —(CH$_2$)$_2$—; and R is methyl, when Z is carbonyl and hydrogen or methyl when Z is methylene, and non-toxic pharmaceutically acceptable salts are useful as analgesics.

---

This application is a continuation-in-part of my co-pending application Ser. No. 571,386, filed Aug. 10, 1966, now abandoned.

This invention relates to novel derivatives of thebaine and oripavine, and their non-toxic pharmaceutically acceptable salts, including the quaternary ammonium salts of the amines, which are useful as analgesics.

According to the present invention there are provided compounds of the following formula, and pharmaceutically acceptable salts of compounds of the said formula:

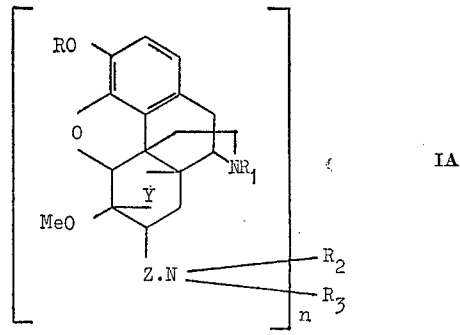

IA where:

$n$ is the integer 1 or 2;
Y is ethene (—CH=CH—) or ethano (—CH$_2$—CH$_2$—);
Z is a carbonyl or methylene group;
R$_1$ is alkyl, alkenyl, alkynyl each of up to 5 carbon atoms, or cycloalkyl methyl of 4 to 6 carbon atoms;
R$_2$ is hydrogen, cycloalkyl of 5 to 6 carbon atoms, phenyl, tolyl, chlorophenyl, dichlorophenyl, naphthyl, alkyl of 1 to 6 carbon atoms, alkyl of 1 to 3 carbon atoms mono-substituted by phenyl, hydroxy, furyl, dimethylamino or diethylamino;
R$_3$ represents, when $n=1$, any one of the substituents set out for R$_2$, and R$_2$ and R$_3$, when taken together with the nitrogen atom to which R$_2$ and R$_3$ are attached, is morpholino, piperidino, pyrrolidino, piperazino or N-methyl piperazino; and when Z is carbonyl either R$_2$ or R$_3$ is amino when the other group R$_2$ or R$_3$ is hydrogen;
R$_3$ is, when $n=2$, the divalent group —(CH$_2$)$_2$—; and R is methyl, when Z is carbonyl and hydrogen or methyl when Z is methylene.

The compounds according to the invention, i.e. the compounds of general Formula Ia may be prepared by treating a compound of the formula:

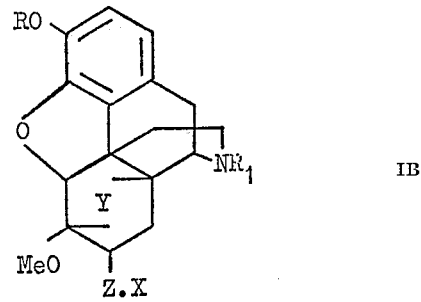

IB where R, R$_1$, Y and Z are as defined above and where X represents a chlorine atom when Z is carbonyl and where X represents a p-toluene sulphonate group when Z is methylene, with the appropriate amino-compound selected from NHR$_2$R$_3$, NHR$_2$.R$_3$.NHR$_2$ or

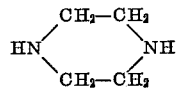

according to the value of $n$ and of the radicals R$_2$ and R$_3$, as hereinbefore defined, required in the compound or pharmaceutically acceptable salt to be formed, the reaction being carried out under the appropriate conditions so as to form the desired compound; and thereafter if desired, or necessary converting the compound to a pharmaceutically acceptable salt, The compounds of general Formula Ia having Y=endoetheno, Z=carbonyl, and n=1, in which neither $R_2$ nor $R_3$ is the amino or substituted amino group, i.e. the amides of general formula:

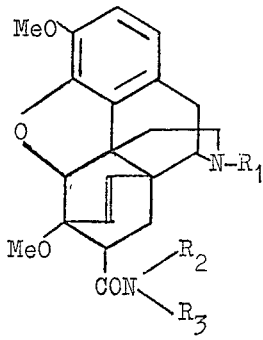

may be prepared from the esters of general formula:

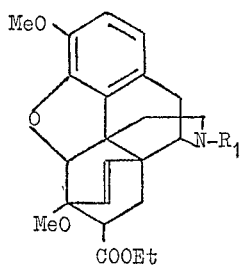

The ester of general Formula III, in which $R_1$ is methyl, may be prepared by the Diels Alder condensation reaction of thebaine with ethyl acrylate. The esters of general Formula III in which $R_1$ is other than a methyl group may be prepared by reaction between the ester of Formula III in which $R_1$ is methyl and methyl or ethyl azodicarboxylic acid to give a product which on treatment with water gives the methylene bis compound of Formula IIIa. The by-products, formaldehyde and methyl or ethyl hydrazodicarboxylates are readily removed.

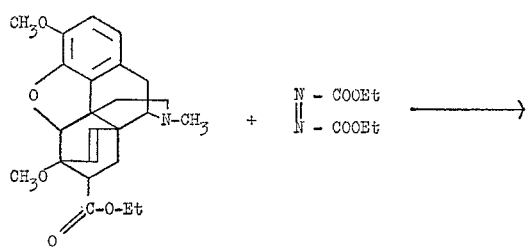

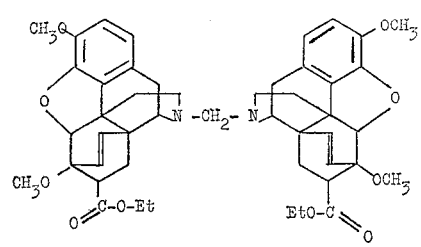

The methylene bis compounds (IIIa) may be converted into a compound of Formula III by treatment with an halide $R^1X$, where $R^1$ is an alkyl, alkenyl or alkynyl group of up to 5 carbon atoms. The esters III are converted via the free acids into the corresponding acid chlorides from which the amides II are prepared by reaction with amines $NHR_2R_3$. The analogous bis-amides i.e. general Formula I where n=2 are obtained from these acid chlorides by reaction with diamines

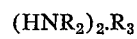

or

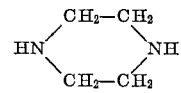

The compounds of general Formula Ia having Y=endoetheno and Z=carbonyl, in which either $R_2$ or $R_3$ is the amino or substituted amino group, i.e. the hydrazides of general Formula II may be prepared by reaction of the acid chlorides mentioned above with excess of the hydrazines $HNR_2R_3$. The hydrazides may additionally be prepared by reaction of the esters III with a large excess of the hydrazines $HNR_2R_3$.

The amines of general formula:

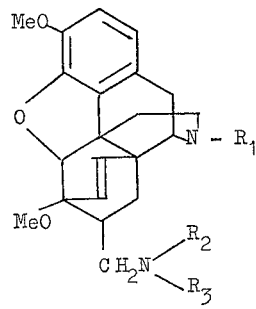

may be prepared by reduction of the amides II e.g. with lithium aluminum hydride. The analogous bis-amines are similarly obtained from the bis-amides.

The amines of general Formula IV may also be prepared by reacting the alcohols of general formula:

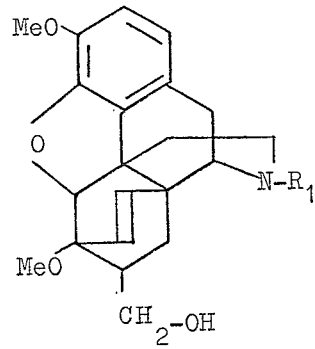

with p-toluene sulphonyl chloride to form p-toluene sulphonic acid esters, (tosyl esters), and then reacting these with the amines $HNR_2R_3$. The analogous bis-amines are similarly obtained from these tosyl esters by reaction with the diamines $(HNR_2)_2R_3$. The alcohols V are prepared by reducing the esters III, e.g. with lithium aluminum hydride.

The compounds of general Formula I in which R=H, Y=endoetheno, Z=methylene and n=1 i.e., compounds of general formula:

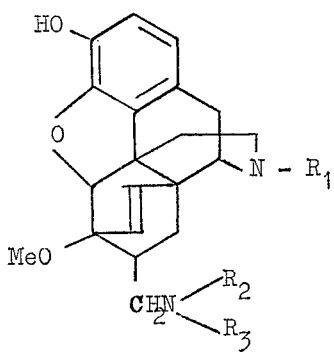

may be prepared by demethylating the compounds IV above with an alkali metal hydroxide in a suitable solvent, such as diethylene glycol, at temperatures slightly above 200° C. The analogous demethylated bis-amines may be similarly obtained from the bis-amines.

The majority of these amines and amides may be hydrogenated to the corresponding 6:14 endoethano derivatives using palladium on charcoal catalyst and also by using Raney nickel catalyst. Clearly this last process is only applicable to the preparations of those compounds having the above formula in which the substitutents on the two nitrogen atoms do not contain groups which are affected by these reduction conditions.

The amides, hydrazides and amines containing the 6:14 endoethano group may be prepared by the methods set out above from the 6:14 endoethano esters, which are prepared by the hydrogenation of the corresponding 6:14 endoetheno esters, the preparation of which is described above.

The following examples further illustrate the invention.

Example 1.—6,14-endoethenotetrahydrothebaine-7-carboxylic acid hydrochloride

Ethyl 6,14-endoethenotetrahydrothebaine-7-carboxylate (200 g.) was heated on a steam bath with aqueous HCl (500 ml. of conc. CHl, 500 ml. of water) for 3 hours; the solution was filtered hot. The filtrate deposited white crystals on cooling which were filtered off and washed well with ice-cold water. The resulting acid was dissolved in hot water and treated with charcoal to give, after filtration and cooling, a product (160 g.) M.P. 246–247° C. (Found: C, 61.2; H, 6.7%. $C_{22}H_{25}O_5N.HCl\frac{1}{2}H_2O$ requires C, 61.6; H, 6.4%.)

The free amino-acid was obtained by continuous ether extraction of an aqueous solution of the hydrochloride adjusted to pH 6.1. In this way it was obtained as prisms, M.P. 230° C. from ethanol. (Found: C, 64.65; H, 6.9%, $C_{22}H_{25}O_5N\frac{1}{2}H_2O$ requires C, 64.4; H, 6.9%.)

Example 2.—7-chlorocarbonyl-6,14-endoethenotetrahydrothebaine hydrochloride 6,14 - endoethenotetrahydrothebaine-7-carboxylic acid, hydrochloride (70 g.), prepared as in Example 1, and dried in a vacuum oven at 120° C., was stirred with dry benzene (200 ml.) and cooled with ice-water while oxalyl chloride (25 ml.) was slowly added. Moisture was excluded from the reaction mixture. After addition of the oxalyl chloride the reaction mixture was allowed to attain room temperature. HCl gas was liberated and the reaction mixture was allowed to stand overnight giving a yellow solution. Benzene, HCl gas and excess oxalyl chloride was removed under partial vacuum at about 40° C. More benzene was added and the process was repeated. The remaining volatile mater was removed under reduced pressure at 90° C. An off-white product of constant weight resulted from repetition of this process. Yield 70 g. (Found: Cl, 16.1%. $C_{22}H_{24}O_4N$, Cl.HCl requires Cl, 16.2%.)

Example 3.—6,14-endoetheno-7-aminocarbonyltetrahydrothebaine

To a slurry of 7-chloorcarbonyl-6,14-endoethenotetrahydrothebaine (prepared as in Example 2 above) in anhydrous ether was added dropwise excess 0.880 ammonia. The initial reaction was vigorous. The product was filtered, washed with a little water, and recrystallized from ethanol to give prisms M.P. 120° C. (Found: C, 66.0; H, 6.9. $C_{22}H_{26}N_2O_4H_2O$ requires C, 66.0; H, 7.0%.)

Example 4.—6,14-endoetheno-7-aminomethyltetrahydrothebaine

The amide from Example 3 (5 g.) in dry tetrahydrofuran (25 ml.) was added to a refluxing slurry of lithium aluminum hydride (2.4 g., 5 equivalents) in tetrahydrofuran (100 ml.) and the resulting mixture boiled under reflux for five hours. The mixture was cooled and cautiously decomposed with a saturated aqueous solution of sodium potassium tartrate. The organic layer was separated and the aqueous layer extracted with ether. The combined organic solutions were dried, and evaporated, and the residue recrystallized from aqueous methanol as prisms (3.5 g.) M.P. 210° C. (Found: C, 64.6; H, 7.9. $C_{22}H_{28}N_2O_3.2H_2O$ requires C, 65.1; H, 7.9%.) Dihydrochloride M.P. 240° C. (Found: C, 55.8; H, 7.1.

$$C_{22}H_{28}N_2O_3.2HCl.2H_2O$$

requires C, 55.4; H, 7.1%.)

Example 5.—6,14-endoetheno-7-dimethylaminocarbonyltetrahydrothebaine

To a slurry of the acid chloride from Example 2 in anhydrous ether was added slowly excess dimethylamine. Water was added, the mixture continuously extracted with ether, the ether extracts evaporated and the residue recrystallized from acetone as prisms M.P. 125° C. (Found: C, 66.8; H, 7.6. $C_{24}H_{30}N_2O_4.H_2O$ requires C, 67.1; H, 7.5%.)

Example 6.—6,14-endoetheno-7-dimethylaminomethyltetrahydrothebaine

The amide from Example 5 (22.5 g.) was added slowly to a stirred slurry of lithium aluminum hydride (4.5 g.) in dry tetrahydrofuran (250 ml.) with external cooling. The mixture was slowly brought to reflux and boiled under reflux for 5 hours. The mixture was cooled and then water (9 g., i.e. 2 g. of water for each 1 g. lithium aluminium hydride employed) diluted with tetrahydrofuran was added. The mixture was filtered, charcoal was added to the filtrate, the soltuion was filtered and dried with sodium sulphate. The dried solution was evaporated, the residual oil titurated with water and the solid base dried (11.8 g.) M.P. 50 to 52° C. The dihydrochloride was obtained (12.5 g.) M.P. 235 to 238° C. (Found: C, 62.1; H, 7.7; N, 5.7. $C_{24}H_{32}N_2O_3.2HCl$ requires C, 61.5; H, 7.3; N, 6.0%.)

Example 7.—6,14-endoetheno-7-dimethylaminomethyltetrahydrothebaine methylchloride Into a solution of amine from Example 6 (1.35 g.) in dry ether, cooled to —30° C., was slowly bubbled methylchloride gas. The mixture after standing for three weeks at ambient temperature was filtered. The product was washed with ether and dried (0.58 g.) M.P. 277–278° C. (Found: C, 65.5; H, 7.6; N, 6.2; Cl 7.6.

$$C_{24}H_{32}N_2O_3 \cdot CH_3Cl$$

requires C, 67.2; H, 7.9; N, 6.3; Cl, 7.9%.)

Example 8.—6,14-endoetheno-7-dimethylaminomethyltetrahydrothebaine methiodide

This was prepared by the addition of methyl iodide to an ether solution of the amine from Example 6. The product was recrystallized from ethanol as prisms M.P. 292° C. (Found: C, 55.8; H, 6.6. $C_{24}H_{32}N_2O_3 \cdot CH_3I$ requires C, 55.8; H, 6.6%.)

Example 9.—6,14-endoetheno-7-dimethylaminomethyltetrahydrooripavine

The base from Example 6 (13.4 g.) was added to a solution of potassium hydroxide (33 g.) in diethylene glycol (160 ml.) boiling under reflux at a temperature of the order of 200° C. under a blanket of nitrogen. The temperature was gradually raised to 228° C. and the mixture boiled under reflux with vigorous stirring under a nitrogen blanket until a test portion diluted with ten times its volume of water gave a homogeneous solution. The mixture was drowned out into a saturated ammonium chloride solution. The solution was extracted with chloroform; the extracts were evaporated to dryness; the residue was dissolved in ethanol and ethanolic hydrogen chloride added. The dihydrochloride was precipitated on the addition of ether and collected (10 g.) M.P. 224–

226° C. (Found: C, 54.5; H, 7.4; N, 5.3; Cl, 13.7. $C_{23}H_{30}N_2O_3 \cdot 2HCl \cdot 3H_2O$ requires C, 54.3; H, 7.5; N, 5.5; Cl, 13.9%.)

Example 10.—6,14-endoetheno-7-diethylaminocarbonyltetrahydrothebaine

The acid chloride from Example 2 (11 g.) was added slowly with good stirring to diethylamine (10 ml.) in water (100 ml.). The mixture was heated to 40° C. On cooling the product was filtered off, washed well and dried (5 g.) M.P. 175–176° C. (Found: C, 71.3; H, 7.8; N, 6.5. $C_{26}H_{34}N_2O_4$ requires C, 71.1; H, 7.8; N, 6.4%.)

Example 11.—6,14-endoetheno-7-diethylaminomethyltetrahydrothebaine

The amide from Example 10 was reduced by the method of Example 6. The product had M.P. 118–119° C. (Found: C, 73.7; H, 8.6; N, 6.6. $C_{26}H_{36}N_2O_3$ requires C, 73.5; H, 8.5; N, 6.6%.)

Example 12.—6,14-endoetheno-7-cyclohexylaminocarbonyltetrahydrothebaine

The acid chloride from Example 2 (8.8 g.) was heated with cyclohexylamine (2 g.) triethylamine (5 g.) and dry benzene (100 ml.) for 2 hours. Benzene and excess triethylamine were removed by distillation and the resulting solid recrystallized from aqueous ethanol (4.5 g.) M.P. 97–98° C. (Found: C, 72.3; H, 7.8; N, 6.1. $C_{28}H_{36}N_2O_4$ requires C, 72.3; H, 7.8; N, 6.0%.)

Example 13.—6,14-endoetheno-7-cyclohexylaminomethyltetrahydrothebaine

The amide from Example 12 (14 g.) in dry dioxan was added to a slurry of lithium aluminum hydride (2.3 g.) in dry dioxan with stirring and external cooling. The mixture was boiled under reflux for 5 hours, cooled, and water (4.6 ml.) in dioxan added slowly with stirring and cooling. The mixture was filtered, and the filtrate evaporated to dryness. The product was recrystallized from aqueous methanol, and then with charcoaling from methanol. The base (3.9 g.) had M.P. 203–204° C. Found: C, 74.2; H, 8.5; N, 6.6. $C_{28}H_{38}N_2O_3$ requires C, 74.6; H, 8.5; N, 6.2%.)

Example 14.—6,14-endoetheno-7-propylaminocarbonyltetrahydrothebaine

This was prepared by the method of Example 12 using propylamine. The product had M.P. 97–100° C. (Found: C, 70.0; H, 7.4; N, 6.4. $C_{25}H_{32}N_2O_4$ requires C, 70.7; H, 7.6; N, 6.6%.)

Example 15.—6,14-endoetheno-7-propylaminomethyltetrahydrothebaine

The amide from Example 14 (13 g.) in dry dioxan was added to a slurry of lithium aluminum hydride (2½ g.) in dry dioxan with stirring and external cooling. The mixture was boiled under reflux for 5 hours, cooled, and water (5 ml.) in dioxan added slowly with stirring and cooling. The mixture was filtered, charcoal was added to the filtrate, the solution filtered and the filtrate evaporated to dryness. The dihydrochloride was obtained (6 g.) M.P. 173–175° C. (Found: C, 59.5; H, 7.7; N, 5.5; Cl, 13.8. $C_{25}H_{34}N_2O_3 \cdot 2HCl \cdot H_2O$ requires C, 59.8; H, 7.6; N, 5.9; Cl, 14.1%.)

Example 16.—6,14-endoetheno-7-propylamino methyltetrahydrooripavine

This was prepared from the base from Example 15 by the method of Example 9. The product had M.P. 205–207° C. (Found: C, 66.1; H, 8.0; N, 6.7.

$C_{24}H_{32}N_2O_3 \cdot 2H_2O$ requires C, 66.6; H, 8.4; N, 6.5%.)

Example 17.—6,14-endoetheno-7-diisopropylaminocarbonyltetrahydrothebaine

This was prepared by the method of Example 12 using diisopropylamine. The product had M.P. 184.5–185.5° C. (Found: C, 71.9; H, 8.2; N, 5.9. $C_{28}H_{38}N_2O_4$ requires C, 72.0; H, 8.2; N, 6.0%.)

Example 18.—6,14-endoetheno-7-diisopropylaminoethyltetrahydrothebaine

This was prepared from the amide from Example 17 by the method of Example 6. The product had M.P. 106–109° C. (Found: C, 73.8; H, 8.8; N, 6.2. $C_{28}H_{40}N_2O_3$ requires C, 74.2; H, 8.9; N, 6.2%.)

Example 19.—6,14-endoetheno-7-di-n-butylaminocarbonyltetrahydrothebaine

This was prepared by the method of Example 12 using di-n-butylamine. The product had M.P. 132–133° C. (Found: C, 72.7; H, 8.6; N, 5.7. $C_{30}H_{42}N_2O_4$ requires C, 72.8; H, 8.6; N, 5.7%.)

Example 20.—6,14-endoetheno-7-di-n-butylaminomethyltetrahydrothebaine

This was prepared from the amide from Example 19 by the method of Example 6. The product had M.P. 95–100° C. (Found: C, 71.6; H, 9.0; N, 5.7.

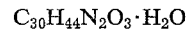

$C_{30}H_{44}N_2O_3 \cdot H_2O$ requires C, 72.2; H, 9.3; N, 5.6%.)

Example 21.—6,14-endoetheno-7-dicyclohexylaminocarbonyltetrahydrothebaine

This was prepared by the method of Example 12 using dicyclohexylamine. The product had M.P. 212–214° C. (Found: C, 74.9; H, 8.2; N, 5.0. $C_{34}H_{46}N_2O_4$ requires C, 74.9; H, 8.4; N, 5.1%.)

Example 22.—6,14-endoetheno-7-dicyclohexyl aminomethyltetrahydrothebaine

This was prepared from the amide from Example 21 by the method of Example 6. The product was an oil. (Found: C, 76.0; H, 9.1; $C_{34}H_{48}N_2O_3$ requires C, 76.6; H, 9.1%.)

Example 23.—6,14-endoetheno-7-n-butylaminocarbonyltetrahydrothebaine

This was prepared by the method of Example 12 using butylamine. The product as the hydrochloride had M.P. 165–170° C. (Found: C, 65.7; H, 7.4; N, 5.9%.

$C_{26}H_{34}N_2O_4 \cdot HCl$ requires C, 65.7; H, 7.4; N, 5.9%.)

Example 24.—6,14-endoetheno-7-n-butylaminomethyltetrahydrothebaine

This was prepared from the amide from Example 23 by the method of Example 15. The product was an oil. (Found: C, 68.7; H, 7.9; N, 6.0; $C_{26}H_{36}N_2O_3 \cdot 1½H_2O$ requires C, 69.0; H, 8.6; N, 6.2%.)

Example 25.—6,14-endoetheno-7-dimethylaminoethylaminomethyltetrahydrothebaine

This was prepared from the amide (3 g., prepared by the method of Example 12 using dimethylethylene diamine) and lithium aluminum hydride (0.8 g.) in dry dioxan by the method of Example 15. The resulting free base was converted to a deliquescent trihydrochloride (1.5 g.). (Found: C, 55.4; H, 8.1; N, 7.4%.

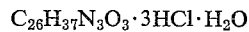

$C_{26}H_{37}N_3O_3 \cdot 3HCl \cdot H_2O$ requires C, 55.1; H, 7.5; N, 7.4%.)

Example 26.—6,14-endoetheno-7-(4-chloroanilinomethyl)tetrahydrothebaine

This was prepared from the amide (prepared by the method of Example 12 using 4-chloroaniline) by the method of Example 15. The product had M.P. 72–74° C. (Found: C, 69.1; H, 6.7; N, 5.8%.

$$C_{28}H_{31}N_2O_3Cl \cdot \tfrac{1}{2}H_2O$$

requires C, 68.9; H, 6.6; N, 5.7%.)

Example 27.—6,14-endoetheno-7-(2,4-dichloro-anilinomethyl)tetrahydrothebaine

This was prepared from the amide (prepared by the method of Example 12 using 2,4-dichloroaniline) by the method of Example 15. The product had M.P. 75–78° C. (Found: C, 65.4; H, 6.2; N, 5.6%. $C_{28}H_{30}N_2O_3Cl_2$ requires C, 65.5; H, 5.9; N, 5.5%.)

Example 28.—6,14-endoetheno-7-(4-chlorobenzyl aminocarbonyl)tetrahydrothebaine

This was prepared by the method of Example 12 using 4-chlorobenzylamine. The product had M.P. 165–166° C. (Found: C, 68.5; H, 6.2; N, 5.4%. $C_{29}H_{31}N_2O_4Cl$ requires C, 68.7; H, 6.2; N, 5.5%.)

Example 29.—6,14-endoetheno-7-(4-chlorobenzyl-aminomethyl)tetrahydrothebaine

This was prepared from the amide from Example 28 by the method of Example 15. The product had M.P. 135–136° C. (Found: C, 70.6; H, 6.8; N, 5.6; Cl, 7.1%. $C_{29}H_{33}N_2O_3Cl$ requires C, 70.6; H, 6.8; N, 5.7; Cl, 7.2%.)

Example 30.—6,14-endoetheno-7-(N-methylanilino-carbonyl)tetrahydrothebaine

This was prepared by the method of Example 12 using N-methylaniline. The product had M.P. 180–181° C.

Example 31.—6,14-endoetheno-7-(N-methylanilino-methyl)tetrahydrothebaine

This was prepared from the amide from Example 30 by the method of Example 6. The product had M.P. 162–166° C. (Found: C, 75.7; H, 7.5% $C_{29}H_{34}N_2O_3$ requires C, 75.9; H, 7.5%.)

Example 32.—6,14-endoetheno-7-(N-isoamylanilino-carbonyl)tetrahydrothebaine

This was prepared by the method of Example 12 using N-isoamylaniline. The product had M.P. 160–163° C.

Example 33.—6,14-endoetheno-7-(N-isoamylanilino-methyl)tetrahydrothebaine

This was prepared from the amide from Example 32 by the method of Example 6. The hydrochloride had M.P. 137–145° C. (Found: C, 64.0; H, 7.5%.

$$C_{33}H_{42}N_2O_3 \cdot 2HCl \cdot 2H_2O$$

requires C, 63.6; H, 7.8%.)

Example 34.—6,14-endoetheno-7-(N-methylcyclo-hexylaminomethyl)tetrahydrothebaine This was prepared from the amide (prepared by the method of Example 12 using N-methylcyclohexylamine) by the method of Example 6. The product had M.P. 143–144° C. (Found: C, 74.8; H, 8.7; N, 6.0%.

$$C_{29}H_{40}N_2O_3$$

requires C, 74.9; H, 8.7; N, 6.0%.)

Example 35.—6,14-endoetheno-7-(dibenzylamino-methyl)tetrahydrothebaine

This was prepared from the amide (prepared by the method of Example 12 using dibenzylamine) by the method of Example 6. The product had M.P. 50–52° C. (Found: C, 79.0; H, 7.4; N, 5.1%. $C_{36}H_{40}N_2O_3$ requires C, 78.8; H, 7.3; N, 5.1%.)

Example 36.—6,14-endoetheno-7-(N-methylcyclo-pentylaminomethyl)tetrahydrothebaine This was prepared from the amide (prepared by the method of Example 12 using N-methylcyclopentylamine) by the method of Example 6. The product had M.P. 152–153° C. (Found: C, 74.8; H, 8.5; N, 6.3%.

$$C_{28}H_{38}N_2O_3$$

requires C, 74.6; H, 8.5; N, 6.2%.)

Example 37.—6,14-endoetheno-7-(pyrrolidinocarbonyl) tetrahydrothebaine

This was prepared by the method of Example 12 using pyrrolidine. The product had M.P. 218–219° C. (Found: C, 71.8; H, 7.4; N, 6.4%. $C_{26}H_{32}N_2O_4$ requires C, 71.5; H, 7.4; N, 6.4%.)

Example 38.—6,14-endoetheno-7-(pyrrolidinomethyl) tetrahydrothebaine

This was prepared from the amide from Example 37, by the method of Example 6. The product had M.P. 59–60° C. (Found: C, 73.8; H, 8.1; N, 6.4%. $C_{26}H_{34}N_2O_3$ requires C, 73.8; H, 8.1; N, 6.6%.)

Example 39.—6,14-endoetheno-7-(N-methylbutylamino-methyl)tetrahydrothebaine

This was prepared from the amide (prepared by the method of Example 12 using N-methylbutylamine) by the method of Example 6. The hydrochloride had M.P. 163–165° C. (Found: C, 61.7; H, 8.1; N, 5.5; Cl, 13.2%. $C_{27}H_{38}N_2O_3 \cdot 2HCl$ requires C, 63.3; H, 7.9; N, 5.5; Cl, 13.8%.)

Example 40.—6,15-endoetheno-7-(N-methylsecbutyl-aminomethyl)-tetrahydrothebaine

This was prepared from the amide (prepared by the method of Example 12 using N-methylsecbutylamine) by the method of Example 6. The hydrochloride had M.P. 163–166° C. (Found: C, 55.6; H, 8.2; N, 4.6%.

$$C_{27}H_{38}N_2O_3 \cdot 2HCl \cdot 4H_2O$$

requires C, 55.5; H, 8.3; N, 4.8%.)

Example 41.—N,N'-bis(7-carbonyl-6,14-endoetheno-tetrahydrothebaine)-hexamethylenediamine 7-chlorocarbonyl - 6,14 - endoethenotetrahydrothebaine (11 g., prepared as in Example 2) was heated with 1,6-hexamethylenediamine (1.45 g.) and triethylamine (5 g.) in dry benzene (150 ml.). The benzene was distilled off, and the residue added to water. The product was filtered off, washed well with water and dried (8.8 g.). M.P. 203–203° C. (Found: C, 71.3; H, 7.5; N, 6.3%. $C_{50}H_{62}N_4O_8$ requires C, 7.09; H, 7.4; N, 6.6%.)

Example 42.—N,N'-dimethyl - N,N' - bis(7-methyl - 6,14-endoethenotetrahydrothebaine)hexamethylenediamine This was prepared by reacting the amine (2 g. prepared by reducing the amide of Example 41 by the method of Example 15) dissolved in dry ether, with excess methyl iodide at room temperature for several days. The resulting precipitate was filtered off, washed well with water and dried (1.5 g.). This dihydroiodide had M.P. 190–191° C. (Found: C, 53.6; H, 6.6; N, 5.1; I, 23.2%. $C_{52}H_{70}N_4O_6 \cdot 2HI$ requires C, 56.6; H, 6.6; N, 5.1; I, 23.0%.)

Example 43.—N-allyl 6, 14-endoethenotetrahydronor-thebaine-7-carboxylic acid hydrochloride Ethyl N-allyl 6,14-endoethenotetrahydronorthebaine-7-carboxylate (50 g.) prepared in the manner described in our British patent specification No. 1,111,584 was heated on a steam bath with aqueous HCl (250 ml. of conc. HCl, 250 ml. of water) for 3 hours. The filtrate deposited white crystals on cooling which were filtered off, washed well with ice-cold water and dried. The product (37.7 g.) had M.P. 195–199° C.

Example 44.—N-allyl 7-chlorocarbonyl-6,14-endoetheno-tetrahydronorthebaine hydrochloride N-allyl 6,14-endothenotetrahydronorthebaine - 7 - carboxylic acid hydrochloride (24 g.), prepared as in Example 43, was stirred in chlorofrom (200 ml.) at room temperature during the dropwise addition of a solution of oxallyl chloride (30 ml.) in chloroform (50 ml.). The mixture was heated at a gentle boil for 6½ hours. The mixture was evaporated and the residue washed with ether. Yield 23 g. (Found: Cl, 14.5%; $C_{24}H_{27}Cl_2NO_4$ requires Cl, 15.3%.)

Example 45.—N-allyl 6,14-endoetheno-7-morpholino-carbonyltetrahydronorthebaine N-allyl 7 - chlorocarbonyl - 6,14 -endoethenotetrahydronorthebaine hydrochloride (23 g.) was treated with morpholine (50 ml.). After warming on a steam bath for 10 minutes the mixture was poured into water (500 ml.). The gummy precipitate yielded solid (20 g.) after washing with water by decantation. A sample recrystalized from ethanol had M.P. 136–138° C. (Found: C, 70.1; H, 7.2; N, 5.9%. $C_{28}H_{34}N_2O_5$ requires C, 70.3; H, 7.2; N, 5.9%.)

Example 46.—N-allyl 6,14-endoetheno-7-morpholino-methyltetrahydronorthebaine (a) A solution of the amide from Example 45 (1.8 g.) in dry tetrahydrofuran (20 ml.) was added to a slurry of lithium aluminum hydride (0.3 g.) in dry tetrahydrofuran (10 ml.), and the resulting mixture boiled under reflux for 4½ hours. The mixture was cooled and cautiously decomposed with a saturated aqueous solution of sodium, potassium tartrate. The organic layer was separated and the aqueous layer extracted with ether. The combined organic solutions were washed with water, dried and evaporated, and the residue recrystallized from ethanol. The crude product (0.7 g.) was further recrystallized twice from aqueous ethanol to give the product (0.16 g.) M.P. 160–161° C. (Found: C, 72.1; H, 7.9; N, 5.9%. $C_{28}H_{36}N_2O_4$ requires C, 72.4; H, 7.8; N, 6.0%.)

(b) A solution of ethyl N-allyl 6,14-endoethenotetrahydronorthebaine-7-carboxylate (50 g.) in dry tetrahydrofuran (350 ml.) was added slowly to a stirred mixture of lithium aluminum hydride (6.25 g.) in dry tetrahydrofuran (250 ml.), and the resulting mixture stirred for 3 hours. The mixture was cautiously decomposed with a saturated aqueous solution of sodium potassium tartrate. The organic layer was separated, and the aqueous layer was extracted with ether (5× 100 ml.). The combined organic solutions were washed with water (4× 100 ml.), dried and evaporated, and the product recrystallized from aqueous ethanol to give 34.7 g. of N-allyl 6,14-endoetheno-7-hydroxylmethyltetrahydronorthebaine M.P. 121° C. A sample recrystallized from acetone-light petroleum had M.P. 121–122° C. (Found: C, 72.4; H, 7.4; N, 3.6%. $C_{24}H_{29}NO_4$ requires C, 72.9; H, 7.4; N, 3.6%).

N-allyl-6, 14-endoetheno-7-hydroxymethyl-tetrahydronorthebaine (39.8 g.) and p-toluene sulphonyl chloride (39.8 g.) were dissolved in pyridine (125 ml.) and the mixture after standing at room temperature for two days, was then poured into an excess of cold water and the whole warmed to about 50° C. The liquor was decanted and replaced by fresh cold water, the solidified oil recovered, dissolved in glacial acetic acid, the solution diluted, treated with charcoal and the product recovered by basification with ammonia. Crystallization from methanol gave 44 g. of N-allyl-6, 14-endoetheno-7-p-toluene sulphonyloxymethyltetrahydronorthebaine M.P. 110°. (Found: C, 67.6; H, 6.5; S, 5.8%. $C_{31}H_{35}NO_6S$ requires C, 67.7; H, 6.4; S, 5.8%.)

A solution of this tosyl ester (10 g.) in morpholine (50 ml.) was boiled under reflux for 4½ hours. After evaporation of about 15 ml. of the excess morpholine under reduced pressure, the residue was poured into an excess of water and the precipitate collected. Recrystallization of this from aqueous ethanol gave the product (6.8 g.) M.P. 159° C. The product was shown by thin-layer chromatography, mixed melting-point, and its infrared spectra to be identical that prepared in method (a).

Example 47.—N-allyl-6,14-endoetheno-7-(N-methylanilinomethyl)tetrahydronorthebaine A mixture of the tosyl ester from Example 46(b) (6.06 g.) and N-methylaniline (12 ml.) was heated under nitrogen for 11 hours in an oil-bath at 120° C. After cooling, aqueous sodium hydroxide was added, and the mixture extracted with ether. The ether extracts were washed with water, dried with sodium sulphate, and evaporated. The residue was heated on a water bath at a reduced pressure of 0.1 mm. for ½ hour to remove excess methylaniline. The glassy residue was dissolved in ether and extracted with 2 N hydrochloric acid (2× 15 ml.). On standing the acid solution deposited crystals (0.25 g.) which were rejected. The solution was treated with charcoal, filtered, basified with aqueous sodium hydroxide, extracted with ether, and the extracts evaporated. The residue wax chromatographed through an alumina column eluating with benzene-ethanol. The product was further furified by solution in acid, treatment with charcoal, basification with ammonia, collection and drying to give 0.96 g., M.P. 48–50° C. (Found: C, 75.4; H, 7.3; N, 5.9%. $C_{31}H_{36}N_2O_3 \cdot \frac{1}{2}H_2O$ requires C, 75.4; H, 7.6; N, 5.7%.)

Example 48.—N-ally-6,14-endoetheno-7-n-proply-aminomethyltetrahydronorthebaine A mixture of the tosyl ester from Example 46(b), (4 g.) and n-propylamine (20 ml.) was boiled under reflux for 72 hours. The excess propylamine was evaporated, aqueous sodium hydroxide added, and the mixture extracted with chloroform. The chloroform extracts were washed with water, dried and evaporated. The residual oil was dissolved in dilute hydrochloric acid, treated with charcoal, filtered, basified and extracted with ether. The ether extracts were dried, treated with ethereal HCl and the solid hydrochloride collected. Boiling of the solid in acetone (100 ml.) for 20 minutes caused the precipitation of crystalline material which was crystallized twice by precipitation with ether from a methanol solution. The product was dried over phosphorous pentoxide for 5 hours at 100° C. and 0.5 mm. This dihydrochloride (0.79 g.) had M.P. 183–185° C. (Found: C, 61.1; H, 7.5; Cl, 13.6%. $C_{27}H_{36}N_2O_3 \cdot 2HCl \cdot H_2O$ requires C, 61.4; H, 7.6; Cl, 13.5%.)

Example 49.—N-allyl-7-benzylaminomethyl-6,14-endoethenotetrahydronorthebaine The tosyl ester from Example 46(b) (10 g.) was heated at 130° C. for 19 hours with benzylamine (20 ml.). The excess benzylamine was removed by distillation under reduced pressure; the residue was treated with aqueous sodium hydroxide solution and extracted three times with ether. The dried ether solution was evaporated and the residue was dissolved in warm 2 N hydrochloric acid solution. The cooled solution deposited a solid which was recrystallized from ethanol and petroleum ether (B.P. 60–80°) to give the dihydrochloride (6.7 g.). A sample further recrystallized and then dried over phosphorous pentoxide at 60° C. and 0.1 mm. had M.P. 193° C. (Found: C, 64.5; H, 7.0; Cl, 12.1%.

$$C_{31}H_{36}N_2O_3 \cdot 2HCl \cdot H_2O$$

requires C, 64.7; H, 7.0; Cl, 12.3%.)

Example 50.—N-allyl-6,14-endoetheno-7-phenethylaminomethyl-tetrahydronorthebaine The tosyl ester from Example 46(b) (10 g.) was heated with phenethylamine (20 ml.) at 130° C for 16 hours. The excess of phenethylamine was removed by evaporation under reduced pressure, the residue was treated with aqueous sodium hydroxide solution and extracted with ether. Evaporation of the ether extracts, finally under reduced pressure, gave a yellow glass which was dissolved in dilute hydrochloric acid. The solution was washed with ether, treated with charcoal, filtered, basified with ammonia and the precipitate collected. The product was purified by further conversion to the hydrochloride and basification, chromatography on an alumina column by eluting with ethyl acetate and repeated recrystallization from petroleum ether (B.P. 40–60°). The product formed rosettes of needles, M.P. 72–73° C. (Found: C, 77.3; H, 7.4; N, 5.7%. $C_{32}H_{38}N_2O_3$ requires C, 77.1; H, 7.7; N, 5.6%.)

Example 51.—N-allyl-6,14-endoetheno-7-piperidinomethyltetrahydronorthebaine

A solution of the tosyl ester from Example 46(b) (10 g.) in piperidine (50 ml.) was boiled under reflux for 18 hours. Most of the excess piperidine was removed by evaporation under reduced pressure. The residue was treated with aqueous sodium hydroxide and extracted with ether. Evaporation of the ether extracts, finally under reduced pressure, gave an oil, which was dissolved in dilute hydrochloric acid. The solution was washed with ether, treated with charcoal, filtered and basified. Extraction with ether, and evaporation of the extracts yielded an amber glass. The product was again dissolved in dilute hydrochloric acid, washed with ether, treated with charcoal, filtered, basified, extracted with ether. Evaporation of the ether extracts gave a clear glass which was chromatographed through an alumina column by eluting with ethyl acetate. The product was recrystallized twice from petroleum ether (B.P. 40–60°) to give the crystalline amine M.P. 93° C. (Found: C, 75.5; H, 8.2; N, 5.8%. $C_{29}H_{38}N_2O_3$ requires C, 75.3; H, 8.3; N, 6.1%.)

Example 52.—6-14-endoetheno-7-(N-ethylanilionomethyl)tetrahydrothebaine

This was prepared from the amide (prepared by the method of Example 12 using N-ethylaniline) by the method of Example 6. The hydrochloride had M.P. 116–118° C. (Found: C, 60.7; H, 7.4; N, 5.1; Cl, 12.5%. $C_{30}H_{36}N_2O_3 \cdot 2HCl \cdot 3H_2O$ requires C, 61.2; H, 7.4; N, 4.9; Cl, 12.5%.)

Example 53.—6,14-endoetheno-7-(N-ethylanilinomethyl)tetrahydrooripavine

The base from Example 52 (9.5 g.) was added to a solution of potassium hydroxide (28 g.) in diethylene glycol (200 ml.) boiling under reflux at a temperature of the order of 190° C. under a blanket of nitrogen. The temperature was gradually raised and the mixture boiled under reflux at a temperature of the order of 210–220° C. with vigorous stirring under a nitrogen blanket until a test portion diluted with ten times its volume of water gave a homogeneous solution. The mixture was drowned out into a saturated ammonium chloride solution. The product was filtered off, dissolved in ethanol, charcoal added, the solution was filtered, and ethanolic hydrogen chloride added. The dihydrochloride was precipitated on the addition of ether and collected (3.6 g.) M.P. 180–182° C. (Found: C, 61.3; H, 7.5; N, 5.1; Cl, 12.5%. $C_{19}H_{34}N_2O_3 \cdot 2H_2O$ requires C, 61.4; H, 7.1; N, 4.9; Cl, 12.5%.)

Example 54.—6,14-endoetheno-7-morpholinocarbonyltetrahydrothebaine

This was prepared by the method of Example 12 using morpholine. The product had M.P. 200–201° C. (Found: C, 68.7; H, 7.0; N, 6.2%. $C_{26}H_{32}N_2O_5$ requires C, 69.2; H, 6.9; N, 6.2%.)

Example 55.—6,14-endoetheno-7-morpholinomethyltetrahydrothebaine (a) This was prepared from the amide of Example 54 by the method of Example 6. The product had M.P. 197–198° C. (Found: C, 71.0; H, 7.5; N, 6.3%. $C_{26}H_{34}N_2O_4$ requires C, 71.1; H, 7.8; N, 6.4%.)

(b) 6,14-endoetheno-7-hydroxymethyltetrahydrothebaine (11.5 g.) p-toluene-sulphonylchloride (9 g.) and pyridine (75 ml.) were kept together at room temperature overnight and the mixture was then poured into water (300 ml.). The aqueous layer was decanted from the precipitated gum which was washed twice with water and then dissolved in warm 2 N hydrochloric acid (150 ml.). Cooling of the solution resulted in the crystallization of 9.7 g. of 6,14-endoetheno-7-p-toluenesulphonyloxymethyltetrahydrothebaine hydrochloride prisms M.P. 138–145° C.

A solution of this tosyl ester hydrochloride (1.58 g.) in morpholine (7.2 ml.) was boiled under reflux for three hours. The solution was cooled, poured into water and the precipitated base (0.76 g.) was collected. Recrystallization of this from ethanol gave the product as prisms M.P. 196–190° C. alone or mixed with material prepared by method (a).

Example 56.—6,14-endoethano-7-piperidinomethyltetrahydrothebaine (a) This was prepared from the amide (prepared by the method of Example 12 using piperidine by the method of Example 6. The product had M.P. 149–151° C. (Found: C, 73.2; H, 8.3; N, 6.4%. $C_{27}H_{36}N_2O_3$ requires C, 74.2; H, 8.3; N, 6.4%.)

(b) A mixture of the tosyl ester from Example 55(b) (5 g.) was refluxed with piperidine (26 ml.) for 7½ hours. The solution was cooled, drowned into water. The precipitated base (3.86 g.) was collected. Recrystallization of this from ethanol gave the product (3.13 g.) with M.P. 150–151° C. The product was shown by thin-layer chromatography and its infra-red spectra to be identical to that prepared in method (a).

Example 57.—6,14-endoetheno-7-piperidinomethyltetrahydrooripavine

This was prepared from the base of Example 56 by the method of Example 53. The base had M.P. 114–116° C. The hydrochloride had M.P. 270–280° C. (Found: C, 60.8; H, 7.5; N, 5.4; Cl, 13.8%.

$$C_{26}H_{34}N_2O_3 \cdot 2HCl \cdot H_2O$$

requires C, 61.1; H, 7.6; N, 5.4; Cl, 13.8%.)

Example 58.—6,14-endoetheno-7-anilinomethyltetrahydrothebaine

This was prepared from the amide (prepared by the method of Example 12 using aniline) by the method of Example 15. The product had M.P. 80–82° C. (Found: C, 71.2; H, 7.1; N, 6.2%. $C_{28}H_{32}N_2O_3 \cdot H_2O$ requires C, 72.6; H, 7.4; N, 6.1%.)

Example 59.—6,14-endoetheno-7-methylaminocarbonyltetrahydrothebaine

This was prepared by the method of Example 10 using methylamine. The product had M.P. 215–216° C. (Found: C, 68.4; H, 7.5; N, 7.2%. $C_{23}H_{28}N_2O_4 \cdot \frac{1}{2}H_2O$ requires C, 68.2; H, 7.2; N, 6.9%.)

Example 60.—6,14-endoetheno-7-hydrazinocarbonyltetrahydrothebaine (a) The acid chloride from Example 2 (11 g.) was added to a large excess of hydrazine hydrate 99–100%, the mixture heated and stirred for 2 hours. The mixture was evaporated and the residue recrystallized from aqueous methanol and then from ethanol. The product had M.P. 202–203° C. (Found: C, 66.1; H, 6.9; N, 10.5%. $C_{22}H_{26}N_3O_4$ requires C, 66.6; H, 6.9; N, 10.6%.)

(b) Ethyl 6,14-endoethenotetrahydrothebaine - 7 - carboxylate (2.5 g.), hydrazine hydrate 99–100% (15 ml.) and 2-ethoxyethanol (12.5 ml.) were boiled under reflux for 18 hours. The mixture was cooled and drowned into water (50 ml.). The solid was filtered off, suspended in water and extracted into chloroform. The extracts were dried, evaporated and the residue recrystallized from ethanol (1.1 g.) M.P. 197–201° C. The product was shown by thin-layer chromatography and its infrared spectra to be identical to that prepared in method (a).

Example 61.—6,14-endoethano-7(N-methylcyclopentyl-aminomethyl) tetrahydrothebaine 6,14- endoetheno-7(N-methylcyclopentylaminomethyl) tetrahydrothebaine (prepared in Example 36) (2.25 g.), dissolved in 100 mls. ethanol, was hydrogenated at room temperature and atmospheric pressure in the presence of ½ g. of 10% palladium on charcoal until the uptake of hydrogen ceased (30 mins.). The catalyst was removed, the solution was concentrated until crystallization occurred, and the product collected (1.64 g.), M.P. 128° C. (Found: C, 74.5; H, 8.9; N, 6.2. $C_{28}H_{40}N_2O_3$ requires C, 74.2; H, 8.9; N, 6.2.)

Example 62.—6,14-endoethano-7(N-methylcyclohexyl-aminomethyl) tetrahydrothebaine This was prepared from the corresponding endoetheno compound (prepared in Example 34) by the method of Example 61. The product had M.P. 115–17° C. (Found: C, 74.1; H, 9.1; N, 6.1; $C_{29}H_{42}N_2O_3$ requires C, 74.6; H, 9.1; N, 6.0.)

Example 63.—6,14-endoethano-7-(piperidinomethyl)-tetrahydrothebaine

This was prepared from the corresponding endoetheno compound (prepared in Example 56) by the method of Example 61. The product had M.P. 69–70° C. (Found: C, 73.6; H, 8.7; N, 6.4. $C_{27}H_{38}N_2O_3$ requires C, 73.9; H, 8.7; N, 6.4.)

Example 64.—6,14-endoetheno-7-(morpholinocarbonyl)-tetrahydrothebaine

This was prepared from the corresponding endoetheno compound (prepared in Example 54) by hydrogenation in glacial acetic acid with 10% palladium on charcoal catalyst at elevated pressure (60 p.s.i.) and temperature (60° C.). The catalyst was removed, the solution concentrated under reduced pressure, diluted with water and the product precipitated by the addition of sodium carbonate solution. The product was collected, washed with water and dried. The product had M.P. 196–200° C. (Found: C, 68.3; H, 7.6; N, 6.1. $C_{26}H_{34}N_2O_5$ requires C, 68.6; H, 7.5; N, 6.2.)

Example 65.—6,14-endoetheno-7-ethylaminocarbonyl-tetrahydrothebaine

This was prepared by the method of Example 12 from the acid chloride of Example 2 (22 g.), triethylamine (10 ml.), anhydrous ethylamine (50 ml.) and dry benzene (20 ml.). The product (7.5 g.) had M.P. 98–100° C. (Found: C, 68.2; H, 7.4; N, 6.5%. $C_{23}H_{30}N_2O_4 \cdot 1H_2O$ requires C, 67.4; H, 7.5; N, 6.6%.)

Example 66.—6,14-endoetheno-7-ethylaminomethyl-tetrahydrothebaine

This was prepared by the method of Example 13 from the amide from Example 65 (7 g.) in dry dioxan with lithium aluminum hydride (1.3 g.). The product was isolated as the hydrochloride in an 80% yield with M.P. 105° C. (Found: C, 58.0; H, 7.8; Cl, 14.5%.

$$C_{24}H_{32}N_2O_3 \cdot 2HCl \cdot 1½H_2O$$

requires C, 58.1; H, 7.5; Cl, 14.3%.)

Example 67.—6,14-endoetheno-7-isopropylaminocar-bonyltetrahydrothebaine

This was prepared by the method of Example 12 from the acid chloride of Example 2 (20 g.), triethylamine (15 ml.), isopropylamine (6 ml.) and dry benzene (150 ml.). The product (8.0 g.) had M.P. 87–89° C. (Found: C, 70.0; H, 7.5; N, 6.5. $C_{25}H_{32}N_2O_4$ requires C, 70.7; H, 7.6; N, 6.6%.)

Example 68.—6,14-endoetheno-7-isopropylaminomethyl-tetrahydrothebaine

This was prepared by the method of Example 13 from the amide from Example 67 (17.5 g.) in dry dioxan with lithium aluminum hydride (3.2 g.). The product was isolated as the hydrochloride in a 20% yield with M.P. 215–218° C. (Found: C, 57.9; H, 8.2; N, 5.5; Cl, 13.6%. $C_{25}H_{34}N_2O_3 \cdot 2HCl \cdot 2H_2O$ requires C, 57.7; H, 7.8; N, 5.4, Cl, 13.6%.)

Example 69.—6,14 - endoetheno-7-(N-methylpiperazino-carbonyl) tetrahydrothebaine This was prepared by the method of Example 12 from the acid chloride of Example 2 (22 g.), triethylamine (10 ml.), N-methylpiperazine (5.5 g.) and dry benzene. The product was recrystallized from acetone with a yield of 22.4 g. M.P. 193–195° C. (Found: C, 69.6; H, 7.6%. $C_{27}H_{35}N_3O_4$ requires C, 69.6; H, 7.6%.)

Example 70.—6,14-endoetheno-7-(N-methylpiperazino-methyl) tetrahydrothebaine

This was prepared by the method of Example 6 from the amide from Example 69 (18.4 g.) in dry tetrahydrofuran with lithium aluminum hydride (3.5 g.). The product was isolated as the hydrochloride (14.6 g.) with M.P. 193–195° C. (Found: C, 52.5; H, 7.9%.) $C_{27}H_{37}N_3O_3 \cdot 3HCl \cdot 3H_2O$ requires C, 52.7; H, 7.5%.)

Example 71.—6,14-endoetheno-7-cyclopropylamino-carbonyltetrahydrothebaine

This was prepared by the method of Example 12 from the acid chloride of Example 2 (22 g.), triethylamine (10 ml.), cyclopropylamine (4 g.) and dry benzene. The product was recrystallized from acetone with a yield of 14.0 g. and M.P. 91–92° C. (Found: C, 70.8; H, 7.6; N, 6.7%. $C_{25}H_{30}N_2O_4$ requires C, 71.0; H, 7.2; N, 6.6%.)

Example 72.—6,14-endoetheno-7-cyclopropylamino-methyl tetrahydrothebaine

This was prepared by the method of Example 13 from the amide from Example 71 (11 g.) in dry dioxan with lithium aluminum hydride (2 g.). The product was isolated as the hydrochloride (8.5 g.), M.P. 208–210° C. (Found: C, 56.5; H, 8.1; N, 4.9%.

$$C_{25}H_{32}N_2O_3 \cdot 2HCl \cdot 3H_2O$$

requires C, 56.0; H, 7.5; N, 5.2%.)

Example 73.—6,14-endoetheno-7-hexylaminocarbonyl-tetrahydrothebaine

This was prepared by the method of Example 12 using n-hexylamine in a 39% yield. The product had M.P. 63–64° C. (Found: C, 69.6; H, 8.2%. $C_{28}H_{28}N_2O_4$ requires C, 69.6; H, 8.3%.)

Example 74.—6,14-endoetheno-7-benzylaminocarbonyl-tetrahydrothebaine

This was prepared by the method of Example 12 from the acid chloride of Example 2 (5.5 g.), triethylamine (2.5 ml.), benzylamine (1.35 g.) and dry benzene. The product (2.9 g.) had M.P. 84–86° C. (Found: C, 73.0; H, 6.8; N, 6.0%. $C_{29}H_{32}N_2O_4$ requires C, 73.6; H, 6.8; N, 5.9.)

Example 75.—6,14-endoetheno-7-(α-naphthylaminocar-bonyl)tetrahydrothebaine

This was prepared by the method of Example 12 from the acid chloride of Example 2 (22 g.), triethylamine (10 ml.), α-naphthylamine (7.2 g.) and dry benzene. The product was recrystallized from methanol with a yield of 54% and M.P. 270–272° C. (Found: C, 74.9; H, 6.3; N, 5.6%. $C_{32}H_{32}N_2O_4$ requires C, 75.6; H, 6.3; N, 5.5%.)

Example 76.—6,14-endoetheno-7-dibenzylaminomethyl-tetrahydrooripavine

This was prepared by the method of Example 9 by adding the base from Example 35 (27.5 g.) to a solution of potassium hydroxide (44 g.) in diethyleneglycol (220 ml.) boiling under reflux at a temperature of the order of 230° C. under a blanket of nitrogen. Heating was continued for about 4 hours. The crude product (23.5 g.) was isolated and crystallized from acetone, M.P. 105–107° C. (Found: C, 78.6; H, 7.2; N, 5.3%. $C_{35}H_{38}N_2O_3$ requires C, 78.6; H, 7.2; N, 5.2%.)

Example 77.—N,N'-bis(7-methyl-6,14-endoethenotetrahydrothebaine)-piperazine

A mixture of 6,14-endoetheno-7-p-toluene sulphonoxymethyltetrahydrothebaine (10 g. prepared as in Example 55(b)) and piperazine hydrate (15 g.) was heated in an oil bath at 140° C. for 5 hours. The crude product was broken up, washed with hot water, dried and crystallized from acetone. The product (1.0 g.) had M.P. 260° C. (Found: C, 73.4; H, 7.8; N, 7.0%. $C_{48}H_{60}N_4O_6$ requires C, 73.1; H, 7.7; N, 7.1%.)

Example 78.—6,14-endoetheno-7-methylaminomethyltetrahydrothebaine

This was prepared by heating the tosyl ester (7 g., prepared as in Example 55(b)) with excess liquid methylamine (20 ml.) in a sealed tube at about 90° C. for 6 hours. The excess methylamine was allowed to evaporate, the residue dissolved in ether and the ether extracts washed with dilute ammonia and then with water. Methanol was added to the ether solution when the product was precipitated. The product was collected and recrystallized from methanol with a yield of 1 g., M.P. 118–120° C. (Found: C, 72.2; H, 7.9%. $C_{22}H_{30}N_2O_3$ requires C, 72.2; H, 7.9%.)

Example 79.—6,14-endoetheno-7-(γ-hydroxypropylaminomethyl)tetrahydrothebaine

This was prepared by heating the tosyl ester (10 g., prepared as in Example 55(b)) with 3-amino-propanol (30 ml.) at 90° C. for 10 hours. The mixture was cooled, poured into saturated brine (500 ml.) and the product extracted with ether. The ether extracts were washed with water, dried and evaporated. The residue (4.6 g.) had M.P. 68–70° C. (Found: C, 70.6; H, 8.0; N, 6.6%. $C_{25}H_{34}N_2O_4$ requires C, 70.4; H, 8.0; N, 6.6%.)

Example 80.—6,14-endoetheno-7-(N-methylfurfurylaminomethyl)tetrahydrothebaine

This was prepared by heating the tosyl ester (5.2 g., prepared as in Example 55(b)) with N-methylfurfurylamine (4 ml.) at 140° C. for about 4 hours. The mixture was cooled, poured into excess water, the product collected and crystallized from methanol with a yield of 3 g., M.P. 120–122° C. (Found: C, 71.5; H, 7.3; N, 5.8%. $C_{28}H_{34}N_2O_4 \cdot \frac{1}{2}H_2O$ requires C, 71.3; H, 7.5; N, 5.9%.)

Example 81.—6,14-endoetheno-7-cyclopentylaminomethyltetrahydrothebaine

This was prepared by heating the tosyl ester (5 g., prepared as in Example 55(b)) with cyclopentylamine (20 ml.) under reflux for 16 hours. After cooling, the mixture was poured into excess water, the product collected, washed and crystallized from methanol. The yield was 58%, M.P. 44–46° C. (Found: C, 74.4; H, 8.2%. $C_{27}H_{35}N_2O_3$ requires C, 74.5; H, 8.1%.)

Example 82.—6,14-endoetheno-7-phenethylaminomethyltetrahydrothebaine

This was prepared by heating the tosyl ester (5 g., prepared as in Example 55(b)) with phenethylamine (15 ml.) at 140° C. for 8 hours. The product was isolated as the hydrochloride (2.2 g.), M.P. 265–270° C. (Found: C, 64.0; H, 7.1; Cl, 13.0%. $C_{30}H_{36}N_2O_3 \cdot 2HCl \cdot 1H_2O$ requires C, 64.0; H, 7.2; Cl, 12.6%.)

Example 83.—6,14-endoetheno-7-[di-(β-hydroxyethyl)aminomethyl]tetrahydrothebaine This was prepared by heating the tosyl ester (10 g., prepared as in Example 55(b)) with diethanolamine (30 ml.) at 100° C. for 6 hours. The mixture was poured into dilute saline solution (2L) and the resulting solid collected, washed and dried. The yield was 4.8 g., M.P. 176–179° C. (Found: C, 68.7; H, 8.1; N, 6.2%. $C_{26}H_{36}N_2O_5$ requires C, 68.4; H, 8.0; N, 6.1%.)

Example 84.—6,14-endoetheno-7-benzylaminomethyltetrahydrothebaine

This was prepared by heating the tosyl ester (5 g., prepared as in Example 55(b)) and benzylamine (15 ml.) at 140° C. for 8 hours. The crude product was recrystallized from methanol (5.2 g.), M.P. 137–138° C. (Found: C, 76.1; H, 7.6; N, 6.2%. $C_{29}H_{34}N_2O_3$ requires C, 76.0; H, 7.5; N, 6.1%.)

Example 85.—6,14-endoethane-7-dimethylaminocarbonyltetrahydrothebaine

This was prepared by adding 7-chlorocarbonyl-6,14-endoethano-tetrahydrothebaine (15.2 g., prepared by the method of Example 2 from 6,14-endoethanotetrahydrothebaine-7-carboxylic acid hydrochloride) portion wise with good stirring to a 33% aqueous solution of dimethylamine (40 ml.) at room temperature. After standing overnight the crude product was filtered off, washed with water, dried and crystallized from methanol containing a little water. The yield was 8.7 g., M.P. 101–102° C. (Found: C, 69.4; H, 7.8; N, 6.5%. $C_{24}H_{32}N_2O_4$ requires C, 69.8; H, 7.8; N, 6.8%.)

Example 86.—6,14-endoethano-7-dimethylaminomethyltetrahydrothebaine

This was prepared by the method of Example 6 from the amide from Example 85 (6.8 g.) in dry tetrahydrofuran with lithium aluminum hydride (1.3 g.). The product was isolated as the hydrochloride (2.7 g.), M.P. 245° C. (decomp.). (Found: C, 58.3, H, 8.2; N, 5.5. $C_{24}H_{34}N_2O_3 \cdot 2HCl \cdot 1H_2O$ requires C, 58.8; H, 7.8; N, 5.7%.)

Example 87.—6,14-endoethano-7-dibenzylaminomethyltetrahydrothebaine 6,14-endoetheno-7-dibenzylaminomethyltetrahydrothebaine (1 g., prepared as in Example 35) dissolved in ethanol (200 ml.) was hydrogenated at room temperature and atmospheric pressures in the presence of 10% palladium on charcoal catalyst (300 mg.) until the uptake of hydrogen ceased (1 hour). After removal of the catalyst and solvent, the product was isolated as its hydrochloride (0.8 g.), M.P. 173–175° C. (Found: C, 65.7; H, 7.4; $C_{36}H_{42}N_2O_3 \cdot 2HCl \cdot 2H_2O$ requires C, 65.5; H, 7.3%.)

Example 88.—6,14-endoethano-7-(N-methylfurfurylaminomethyl)tetrahydrothebaine 6,14-endoetheno-7 - (N - methylfurfurylaminomethyl) tetrahydrothebaine (1.5 g., prepared as in Example 80) dissolved in ethanol (150 ml.) was hydrogenated at room temperature and atmospheric pressure in the presence of 10% palladium on charcoal catalyst (250 mg.) until the uptake of hydrogen ceased (2 hours). After removal of the catalyst and solvent the product was crystallised from methanol (0.65) g.), M.P. 96–97° C. (Found: C, 71.6; H, 7.7; $C_{28}H_{36}N_2O_4 \cdot \frac{1}{2}H_2O$ requires C, 71.0; H, 7.9%.)

Example 89.—6,14-endoethano-7-morpholinomethyl tetrahydrothebaine 6,14-endoetheno - 7 - hydrocymethyltetrahydrothebaine (15 g.) dissolved in ethanol (100 ml.) was hydrogenated at room temperature and atmospheric pressure in the presence of 10% palladium on charcoal catalyst (1 g.) until the uptake of hydrogen ceased (3 hours). After the removal of catalyst and solvent, the product was reacted with p-toluenesulphonylchloride by the method of Example 55(b) to give 12.0 g. of 6,14-endoethano-7-p-toluene-sulphonyloxymethyltetrahydrothebaine, M.P. 148–149° C. (Found: C, 66.2; H, 6.7; N, 2.8; S, 5.9%. $C_{29}H_{35}NO_6S$ requires C, 66.2; H, 6.7; N, 2.7; S, 6.1%.)

A solution of this ethano tosyl ester (12 g.) in morpholine (75 ml.) was boiled under reflux for 8 hours. The solution was concentrated to about 50 ml. and poured into ice/water. The product was collected, washed with water and crystallised from methanol (6.7 g.), M.P. 188° C. (Found: C, 71.4; H, 8.5; N, 6.4%. $C_{26}H_{36}N_2O_4$ requires C, 70.8; H, 8.2; N, 6.4%.)

Example 90.—6,14-endoethano-7-[di-(β-hydroxyethyl)aminomethyl]tetrahydrothebaine This was prepared by the method of Example 89 by heating the ethano tosyl ester (8 g.) and diethanolamine (30 ml.) at 100° C. for 6 hours. The product was obtained in a 71% yield, M.P. 172–174° C. (Found: C, 68.2; H, 8.4; N, 6.2%. $C_{26}H_{38}N_2O_5$ requires C, 68.1; H, 8.4; N, 6.1%.)

The thebaine and oripavine derivatives of the present invention and their non-toxic pharmaceutically acceptable salts exhibit analgesic activity through their power to affect the central nervous system. They may be administered by the same routes of administration as morphine. In addition the compounds of the present invention exhibit sedative and antitussive effects.

The compounds of the present invention have exhibited analgesic activity in one or both of the following recognised analgesic tests. The test procedures used to indicate analgesia in animals were the rat-tail pressure method of Green H. F. and Young P. A. (1951) Br. J. Pharmac. Chemother, 6, 572, and the Hendershot and forsaith phenylquinone anti-writhing test in mice J. Pharmac. Exp. Ther. 1959, 125, 237–240.

Compounds useful against high intensities of pain were found to be active in the tail pressure test using the following technique. Male rats weighting 60–80 g. received either saline as controls, or one of a logarithmic series of doses of the drug, either subcutaneously or orally 30 and 60 minutes respectively before determining pain thresholds. The animals were regarded as showing analgesia if they failed to squeal on application of a pressure greater than twice the mean pressure required to cause a vocal response in the controls. From the percentage showing analgesia at each dose level the $ED_{50}$ was calculated. Codeine and morphine are found to be active as analgesics in this test. The following table sets out the results for this test for some representative compounds of the invention.

| Number of example: | Analgesia, $ED_{50}$ mg./kg. |
|---|---|
| 12 | 3 |
| 54 | 9.5 |
| 76 | 0.27 |
| 87 | 24 |
| Codeine | 17 |
| Morphine | 2.1 |

Compounds active against moderate intensities of pain were found to be active in the mouse anti-writhing test. The Hendershot and Forsaith test was carried out by injecting female mice with the drug under test or saline for control purposes at various times before an intraperitoneal injection of phenyl-p-benzoquinone. The dose of the drug required to reduce by 50% the number of abdominal stretches caused by the irritant action of the phenyl-p-benzoquinone was calculated by comparison with the controls. The following table sets out results for representative compounds by this test method with subcutaneous administration.

| Number of example: | Analgesia, $ED_{50}$ mg./kg. |
|---|---|
| 15 | 6 |
| 59 | 11 |
| 79 | 1.85 |
| Morphine | 0.64 |
| Codeine | 5.6 |

The antitussive activity of certain of the compounds of the present invention was measured in guinea pigs using a modified form of the apparatus described by Winter C. A. and Flataker L. (1954) J. Pharmac. Exp. Ther., 112, 99.

Groups of 12–36 guinea pigs were exposed for 5 minutes to a 20% citric acid aerosol. Drugs, or saline for control purposes, were given either subcutaneously or orally 30 and 60 minutes respectively before recording the coughs occurring in each group. The reduction in number of coughs at each dose level was assessed by comparison with the controls and plotted against the logarithm of the dose given. The dose required to inhibit the number of coughs by 50% was determined.

The results obtained are set out below:

| Example number: | Antitussive activity, $ED_{50}$ mg./kg. |
|---|---|
| 12 | 3 |
| 16 | 9 |
| 17 | 4 |
| 35 | 3.5 |
| 54 | 5.4 |
| 59 | 12 |
| 76 | 0.37 |
| 79 | 2.4 |
| 87 | 0.7 |
| Codeine | 30 |
| Morphine | 7.5 |

The compounds having antitussive activity may be incorporated into suitable formulations for oral administration such as a linctus or a pastille.

When mixed with suitable excipients or diluents, the compounds of this invention can be prepared as pills, capsules, powders, solutions, suspensions and the like for unit dosage, to simplify administration. As analgesics they will relieve pain by an action on the nerve centers within the central nervous system. As antitussives they depress the cough center.

We claim:

1. A compound selected from the group consisting of a compound of the formula:

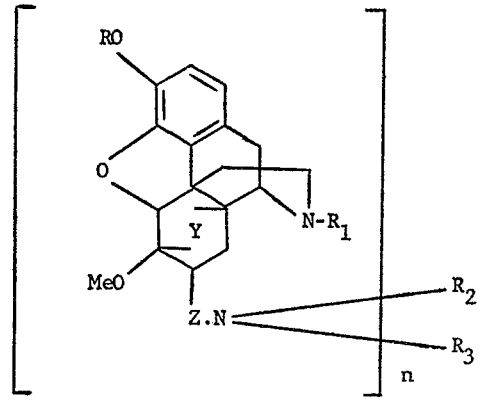

and a pharmaceutically acceptable salt thereof, where:

$n$ is the integer 1 or 2;

Y is etheno (—CH=CH—) or ethano (—CH$_2$—CH$_2$—)

Z is carbonyl or methylene;

$R_1$ is alkyl, alkenyl or alkynyl each of up to 5 carbon atoms or cycloalkyl methyl of 4 to 6 carbon atoms;

$R_2$ is hydrogen, cycloalkyl of 5 or 6 carbon atoms, phenyl tolyl, naphthyl, monochlorophenyl, dichlorophenyl, alkyl of 1 to 6 carbon atoms, alkyl of 1 to 3 carbon atoms monosubstituted by phenyl, hydroxy, furyl, dimethylamino or diethylamino;

$R_3$ is, when $n=1$, any of the substituents set out for $R_2$, and $R_2$ and $R_3$, when taken together with the nitrogen atom to which $R_2$ and $R_3$ are attached is morpholino, piperidino, pyrrolidino, piperazino or N-methyl piperazino; and when Z is carbonyl either $R_2$ or $R_3$ is amino, when the other group $R_2$ or $R_3$ is hydrogen;

$R_3$ is, when $n=2$, the divalent group $—(CH_2)_2—$; and R is methyl when Z is carbonyl and hydrogen or methyl when Z is methylene.

2. A compound according to claim 1 wherein $R_1$ is methyl or allyl.

3. A compound selected from the group consisting of a compound of the formula:

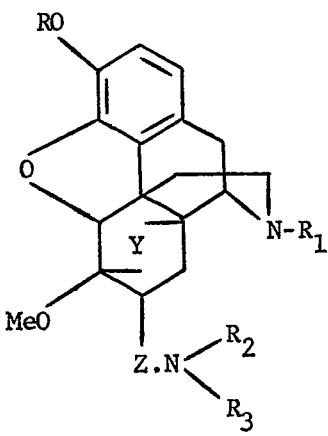

and a pharmaceutically acceptable salt thereof, where:

Y is etheno ($—CH=CH—$) or ethano ($—CH_2—CH_2—$)

Z is carbonyl or methylene;

$R_1$ is alkyl, alkenyl or alkynyl each of up to 5 carbon atoms or cycloalkyl methyl of 4 to 6 carbon atoms;

$R_2$ is hydrogen, cycloalkyl of 5 or 6 carbon atoms, phenyl, tolyl, naphthyl, monochlorophenyl, dichlorophenyl, alkyl of 1 to 6 carbon atoms, alkyl of 1 to 3 carbon atoms monosubstituted by phenyl, hydroxy, furyl, dimethylamino or diethylamino;

$R_3$ is any of the substituents set out for $R_2$, and $R_2$ and $R_3$, when taken together with the nitrogen atom to which $R_2$ and $R_3$ are attached is morpholino, piperidino, pyrrolidino, piperazino or N-methyl piperazino; and when Z is carbonyl either $R_2$ or $R_3$ is amino, when the other group $R_2$ or $R_3$ is hydrogen; R is methyl when Z is carbonyl and hydrogen or methyl when Z is methylene.

4. 6,14-endoetheno - 7 - (N-dibenzylaminomethyl) tetrahydrothebaine having the formula:

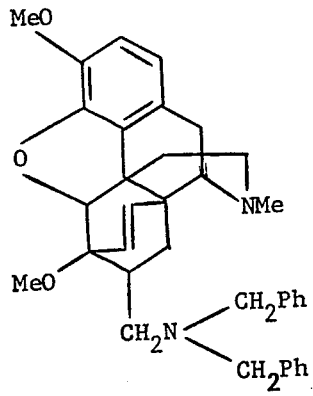

References Cited

UNITED STATES PATENTS

| | | | |
|---|---|---|---|
| 3,285,914 | 11/1966 | Gordon | 260—285 |
| 3,318,885 | 5/1967 | Brown et al. | 260—247.5 |
| 3,329,682 | 7/1967 | Bentley | 260—285 |

ALEX MAZEL, Primary Examiner

D. G. DAUS, Assistant Examiner

U.S. Cl. X.R.

260—247.5, 268; 424—260